US012605652B1

(12) United States Patent
Stiles

(10) Patent No.: US 12,605,652 B1
(45) Date of Patent: Apr. 21, 2026

(54) COMPACT ROTATING FLUID STABILIZER AND MULTIPHASE SEPARATOR SYSTEM

(71) Applicant: David Stiles, Fulshear, TX (US)

(72) Inventor: David Stiles, Fulshear, TX (US)

( * ) Notice: Subject to any disclaimer, the term of this patent is extended or adjusted under 35 U.S.C. 154(b) by 455 days.

(21) Appl. No.: 18/225,526

(22) Filed: Jul. 24, 2023

Related U.S. Application Data

(63) Continuation-in-part of application No. 18/103,453, filed on Jan. 30, 2023, now abandoned.

(60) Provisional application No. 63/344,207, filed on May 20, 2022.

(51) Int. Cl.
| | |
|---|---|
| *B01D 19/00* | (2006.01) |
| *B01D 17/02* | (2006.01) |
| *B04B 5/04* | (2006.01) |
| *B04B 9/06* | (2006.01) |
| *B04B 11/02* | (2006.01) |

(52) U.S. Cl.
CPC ..... *B01D 19/0057* (2013.01); *B01D 17/0217* (2013.01); *B01D 19/0031* (2013.01); *B04B 5/0442* (2013.01); *B04B 9/06* (2013.01); *B04B 11/02* (2013.01)

(58) Field of Classification Search
CPC ............ B01D 19/0057; B01D 17/0217; B01D 19/0031; B04B 5/0442; B04B 9/06; B04B 11/02
USPC ... 494/14, 26, 31–35, 42–43, 83–84, 50–51, 494/63–64, 80, 67; 433/92
See application file for complete search history.

(56) References Cited

U.S. PATENT DOCUMENTS

| | | | | |
|---|---|---|---|---|
| 4,626,237 | A | * 12/1986 | Galloway, Jr. ..... | B01D 19/0052 |
| | | | | 494/44 |
| 5,156,586 | A | * 10/1992 | Fitch, Jr. ................... | B04B 1/00 |
| | | | | 494/67 |
| 5,370,600 | A | * 12/1994 | Fitch, Jr. ................... | B04B 1/00 |
| | | | | 494/67 |
| 5,484,383 | A | * 1/1996 | Fitch, Jr. ................... | B04B 1/00 |
| | | | | 494/67 |
| 2010/0204032 | A1 * | 8/2010 | Pregenzer ............... | B04B 15/02 |
| | | | | 494/59 |

FOREIGN PATENT DOCUMENTS

WO      WO-9639254 A1 * 12/1996      ............. B01D 45/12

* cited by examiner

*Primary Examiner* — Charles Cooley
(74) *Attorney, Agent, or Firm* — Richard Eldredge; Leavitt Eldredge Law Firm

(57) ABSTRACT

A compact rotating fluid stabilizer and multiphase separator system separates a multiphase input fluid flow and delivers single phase liquid streams at elevated pressure from inlet conditions. A separator housing with a lower separation chamber and an upper separation chamber rotates about a central axis. The input flow is received into the lower separation chamber and centrifuged into its constituent phases. A gaseous phase migrates through a rotary structured packing up a center tube and exits through a discharge pipe atop the housing. A heavy liquid phase is delivered at high pressure through a first diffuser ring with permeable gas tip seals supplied by high pressure gas. A lighter liquid phase migrates over a weir into an upper separation chamber and is delivered to a second diffuser ring. The compressor reduces vapor pressure to stabilize the light liquid phase.

7 Claims, 2 Drawing Sheets

COMPACT ROTATING FLUID STABILIZER AND MULTIPHASE SEPARATOR SYSTEM

BACKGROUND

1. Field of the Invention

The present invention relates generally to petroleum production systems, and more specifically, to system for separating a mixed flow into its constituent substances or phases.

2. Description of Related Art

Petroleum production systems are well known in the art and are effective means to extract natural reserves of oil, gas and the like from the earth. For example, FIG. 1 depicts a conventional petroleum processing system 101 having a tube 103 that leads to a storage tank 105 from a well head 107. During use, petroleum is extracted from the ground and placed in the tank 105 via the tube 103. The petroleum is then classified in phases and materials then separated.

One of the problems commonly associated with system 101 is its limited efficiency. For example, the multiphase petroleum passing through the tube is not sorted and separated, and additional steps and equipment are necessary to do so in order to produce the desired output products.

Accordingly, although great strides have been made in the area of petroleum processing systems, many shortcomings remain which the present invention seeks to solve, as will be described and appreciated hereinafter.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
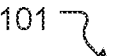
FIG. 1 is a simplified diagram of a common petroleum extraction and storage system.
Figure 1:
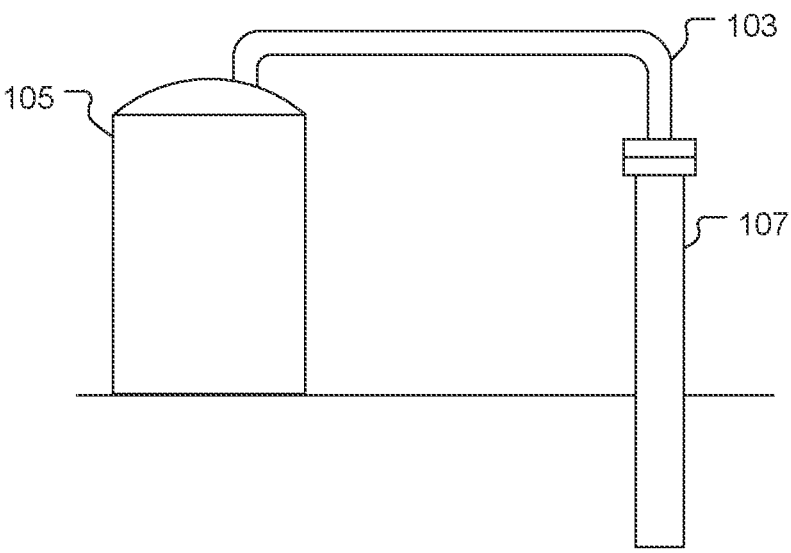

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional petroleum processing systems. Specifically, the system of the present invention combines multiple process steps into one compact integral machine. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
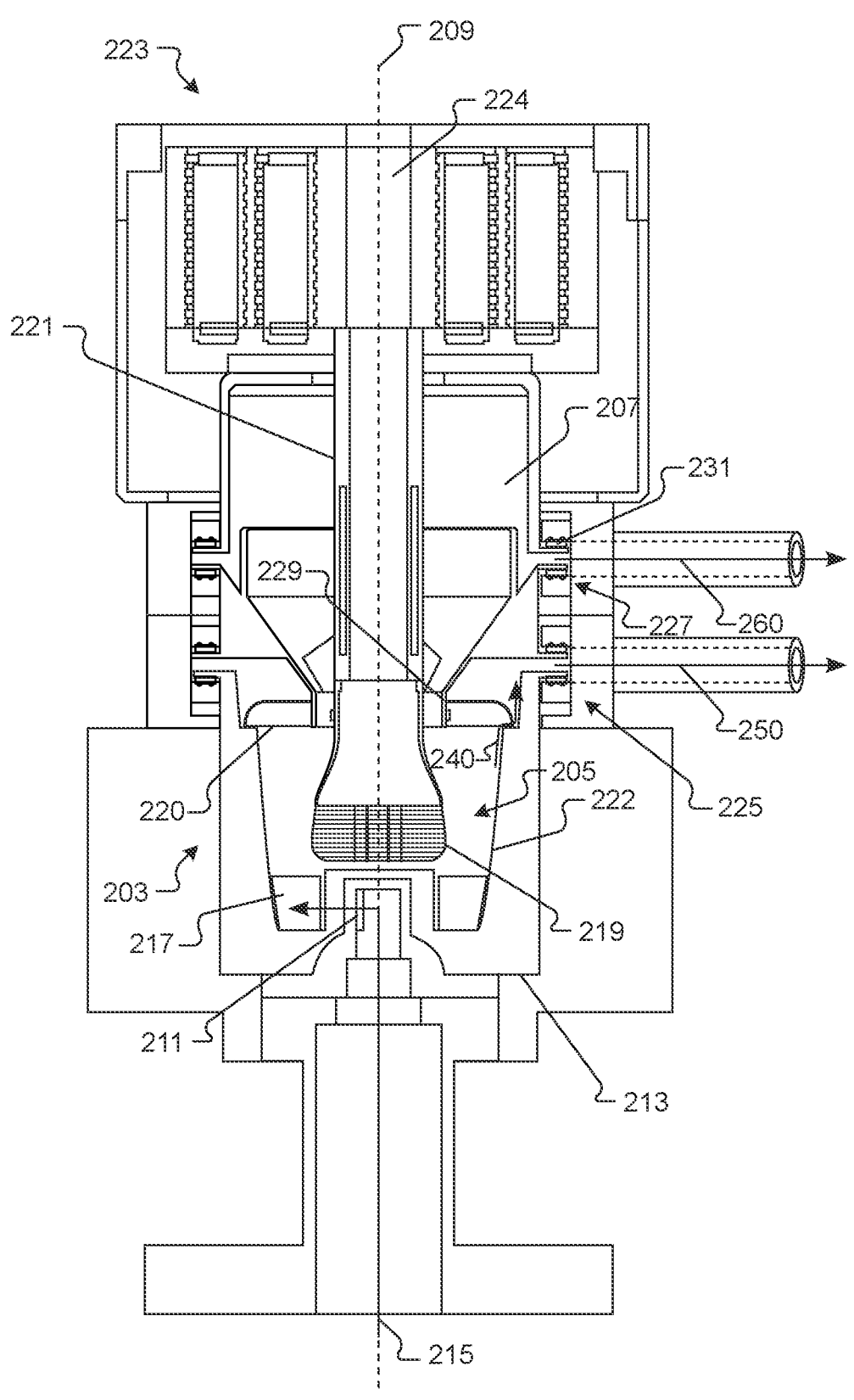
FIG. 2 is a side cross-sectional view of a preferred embodiment of the multiphase separator system of the present application.

Referring now to the drawings wherein like reference characters identify corresponding or similar elements throughout the several views, FIG. 2 depicts a cross-sectional side view of a compact rotating fluid stabilizer and multiphase separator system 201 in accordance with a preferred embodiment of the present application. It will be appreciated that system 201 overcomes one or more of the above-listed problems commonly associated with conventional petroleum storage systems.

In the contemplated embodiment, system 201 includes a separator housing 203 having a lower separation chamber 205 and an upper separation chamber 207 configured to rotate about a central axis 209. The rotation of the separator housing 203 may be powered by any suitable means, including, but not limited to, an electric motor, a generator, or kinetic energy received from an input fluid flow 215. An inlet 211 positioned at a bottom 213 of the separator housing 203 is configured to receive an input fluid flow 215 into the lower separation chamber 205.

Preferably, the input fluid flow 215 is discharged tangentially through converging slots of an inlet flow nozzle, imparting kinetic energy onto a plurality of energy recovery vanes 217 positioned within and radially distributed about the lower separation chamber 205. The energy recovery vanes 217 capture the kinetic energy imparted from the input fluid flow 215 to drive or assist in driving rotation of the separator housing 203.

In the contemplated embodiment, the input fluid flow 215 is understood to be a three-phase flow comprising a gaseous phase, a heavy liquid phase, and a light liquid phase. As the separator housing 203 rotates at high speed, the three-phase flow is rapidly centrifuged and separated into its constituent parts, wherein the input flow is separated into the gaseous phase, heavy liquid phase, and light liquid phase through the rotation of the separator housing 203. The heavy liquid phase and the light liquid phase are termed as such according to their relative densities to each other. In the contemplated embodiment, the heavy liquid phase corresponds to water, while the light liquid phase corresponds to oil, as is typical when extracting and processing petroleum. However, it should be understood and will be appreciated that the present invention can separate and stabilize any fluids with different densities.

A rotary structured packing 219 is connected within the lower separation chamber 205. In various embodiments, the rotary structured packing 219 may take various suitable forms, such as a filter, or the like. The rotary structured packing 219 is positioned concentrically within the lower separation chamber 205 and is rotatably coupled with the separator housing 203 such that the rotary structured packing 219 and the separator housing 203 continually share the same angular velocity about the central axis 209. A center tube 221 is concentrically connected in fluid communication with the rotary structured packing 219, extending upward through the upper separation chamber 207, arriving at a discharge pipe 224 traversing centrally through a compressor 223 mounted atop the separator housing 203. The discharge pipe 224 acts as a simple passage physically passing through the compressor 223 but separate from the operation of the compressor 223.

The lower separation chamber 205 around the rotary structured packing 219 is sealed from the upper separation chamber 207 by a regulating plate 220 that extends outward from the rotary structured packing 219 and terminating adjacent to an inner wall 222 of the lower separation chamber 205 at an upper end of the lower separation chamber 205. The centrifuged liquid climbs the inner wall 222 and can only exit the lower separation chamber 205 through a small gap between the regulating plate 220 and the inner wall 222, illustrated in FIG. 2 at 240. During operation, this gap will be continually occupied by liquid, which acts as a liquid seal between the lower separation chamber 205 and upper separation chamber 207, allowing the pressure of the upper separation chamber 207 to be drawn down to a pressure substantially lower than that of the lower separation chamber 205. For example, a typical chamber pressure of the lower separation chamber 205 may be around 250 psi, with the upper separation chamber having a sub-atmospheric chamber pressure, or less than 14.7 psi. This serves the purpose of stabilizing the light liquid phase by aiding in the evaporation of lighter impurities at high heat, leaving behind a purer and more stable liquid product.

Preferably, in the contemplated embodiment, the compressor 223 is a moving wall, positive displacement compressor 223, and is concentrically connected to and in fluid communication with the upper separation chamber 207. The compressor 223 is configured to reduce gas pressure within the upper separation chamber 207.

As the separator housing 203 rotates, the gaseous phase migrates from the lower separation chamber 205, through the rotary structured packing 219, and into the center tube 221. The rotary structured packing 219 separates any liquid from the gaseous phase and sends the gaseous phase up the center tube 221 as liquid free gas at reduced pressure, where it continues on and is discharged through the discharge pipe 224, where it is collected for transport.

A first diffuser ring 225 is perimetrically connected around the lower separation chamber 205. During rotation of the separator housing 203 and resulting separation of the three-phase flow into its constituent components, the heavy liquid phase migrates within the lower separation chamber 205 toward the first diffuser ring 225 and exits the separator housing 203 therethrough, as illustrated at 250. In the contemplated embodiment, the regulating plate 220 seals the heavy liquid phase in the lower separation chamber 205 from reaching the first diffuser ring 225 until a sufficient level of the heavy liquid phase is built up to overcome the pressure of the regulating plate 220. The heavy liquid phase, being separated under thousands of G force, is delivered at high pressure in the first diffuser ring 225.

A second diffuser ring 227 is perimetrically connected around the upper separation chamber 207. During rotation of the separator housing 203, the light liquid phase migrates over a weir 229 into the upper separation chamber 207 and toward the second diffuser ring 227 and exits the separator housing 203 therethrough, as illustrated at 260. The weir 229 allows the light liquid phase to build up to an appropriate level to be delivered to the second diffuser ring 227 at sufficiently high pressure. The compressor 223 stabilizes the light liquid phase within the separator housing 203 by reducing the vapor pressure within the upper separation chamber 207 above the light liquid phase (oil) below the pressure at the inlet 211 in order to meet a specific vapor pressure requirement for the light liquid phase.

In the contemplated embodiment, each diffuser ring has at least one permeable seal 231 which prevents fluid from leaking back into the separator housing 203. Further, in the contemplated embodiment, each diffuser ring is a partial emission diffuser ring, and each permeable seal 231 is a porous gas tip seal supplied by high pressure gas from any suitable source, herein unspecified. The permeable seals 231 prevent fluid from passing into the cavity between rotating separator and its stationary casing.

It is contemplated and will be appreciated that multiple units of the previously described multiphase separator invention may be arranged together in a stack to generate a distillation or fractionation process.

It is further contemplated that the present invention may be placed downhole in an oil well reservoir, such that the separated water generated as the heavy liquid phase may be reinjected back into the reservoir and the separated oil phase may be delivered to the surface already at pipeline quality specifications. The associated gas phase may further be configured to reach the surface at a desirable state with an appropriate pressure.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A compact rotating fluid stabilizer and multiphase separator system comprising:

a separator housing having a lower separation chamber and an upper separation chamber, the separator housing being configured to rotate about a central axis;

an inlet configured to receive three-phase flow into the lower separation chamber, wherein the three-phase flow is separated into a gaseous phase, a heavy liquid phase, and a light liquid phase through the rotation of the separator housing;

a rotary structured packing connected within the lower separation chamber, wherein the gaseous phase migrates through the rotary structured packing into a center tube as the separator housing rotates, wherein the center tube extends through the upper separation chamber;

a compressor mounted atop the separator housing and center tube, wherein the compressor is configured to reduce gas pressure within the upper separation chamber, and wherein the gaseous phase exits the separator housing through a discharge pipe traversing centrally through the compressor;

a first diffuser ring perimetrically connected around the lower separation chamber, wherein the heavy liquid phase migrates within the lower separation chamber toward the first diffuser ring and exits the separator housing therethrough; and a second diffuser ring perimetrically connected around the upper separation chamber, wherein the light liquid phase migrates over a weir into the upper separation chamber and toward the second diffuser ring and exits the separator housing therethrough.

2. The compact rotating fluid stabilizer and multiphase separator system as claimed in claim 1, wherein the three-phase flow is discharged tangentially through converging slots of the inlet into a plurality of energy recovery vanes within the lower separation chamber.

3. The compact rotating fluid stabilizer and multiphase separator system as claimed in claim 1, wherein each said diffuser ring has at least one permeable seal.

4. The compact rotating fluid stabilizer and multiphase separator system as claimed in claim 3, wherein each said diffuser ring is a partial emission diffuser ring, and wherein each said permeable seal is a porous gas tip seal supplied by high pressure gas, wherein each said permeable seal prevents fluid from passing into a cavity between the rotating separator housing and a stationary casing.

5. The compact rotating fluid stabilizer and multiphase separator system as claimed in claim 1, wherein the compressor is a moving wall compressor.

6. The compact rotating fluid stabilizer and multiphase separator system as claimed in claim 1, wherein the compressor reduces the gas pressure within the upper separation chamber below a pressure of the inlet in order to meet a specific vapor pressure requirement for the light liquid phase.

7. The compact rotating fluid stabilizer and multiphase separator system as claimed in claim 1, wherein a regulating plate seals the heavy liquid phase in the lower separation chamber from the first diffuser ring until a sufficient level of the heavy liquid phase is built up to overcome a pressure of the regulating plate.

* * * * *